US012525380B2

(12) United States Patent
Kim et al.

(10) Patent No.: US 12,525,380 B2
(45) Date of Patent: Jan. 13, 2026

(54) MAGNETIC ELEMENT AND CIRCUIT BOARD COMPRISING THE SAME

(71) Applicant: LG INNOTEK CO., LTD., Seoul (KR)

(72) Inventors: Bi Yi Kim, Seoul (KR); Yu Seon Kim, Seoul (KR); Seok Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 614 days.

(21) Appl. No.: 18/013,103

(22) PCT Filed: Aug. 20, 2021

(86) PCT No.: PCT/KR2021/011128

§ 371 (c)(1),
(2) Date: Dec. 27, 2022

(87) PCT Pub. No.: WO2022/039556

PCT Pub. Date: Feb. 24, 2022

(65) Prior Publication Data

US 2023/0253138 A1 Aug. 10, 2023

(30) Foreign Application Priority Data

Aug. 21, 2020 (KR) ........................ 10-2020-0105378

(51) Int. Cl.
*H01F 17/00* (2006.01)
*H01F 27/24* (2006.01)
(Continued)

(52) U.S. Cl.
CPC ......... *H01F 17/0013* (2013.01); *H01F 27/24* (2013.01); *H01F 27/2804* (2013.01);
(Continued)

(58) Field of Classification Search
CPC ......... H01F 27/2804; H01F 2027/2809; H01F 2027/2819; H01F 17/0006; H01F 17/0013;
(Continued)

(56) References Cited

U.S. PATENT DOCUMENTS 4,873,757 A * 10/1989 Williams ............ H01F 17/0013 29/852
5,386,206 A * 1/1995 Iwatani ................. H01F 41/046 336/200
(Continued)

FOREIGN PATENT DOCUMENTS

JP 2000-315930 11/2000
KR 10-2009-0118605 11/2009
(Continued)

OTHER PUBLICATIONS

European Search Report dated Jun. 24, 2024 issued in Application No. 21858643.6.
International Search Report dated Dec. 6, 2021 issued in Application No. PCT/KR2021/011128.
Japanese Notice of Allowance dated Jul. 8, 2025, issued in Application No. 2023-505416.

*Primary Examiner* — Tszfung J Chan
(74) *Attorney, Agent, or Firm* — KED & ASSOCIATES, LLP

(57) ABSTRACT

An inductor according to an embodiment includes a core unit and a coil unit wherein a first coil unit includes a first upper conductive pattern and a first lower conductive pattern, wherein the second coil unit includes a second upper conductive pattern and a second lower conductive pattern, wherein the coil unit includes a center portion, a first pattern lead-out portion, and a second pattern lead-out portion, and wherein, in the second pattern lead-out portion, the second upper conductive pattern and the second lower conductive pattern overlap each other in a vertical direction such that at least a portion of the second upper conductive pattern and at
(Continued)

least a portion of the second lower conductive pattern intersect each other when viewed in a plan view.

20 Claims, 12 Drawing Sheets

(51) Int. Cl.
*H01F 27/28* (2006.01)
*H01F 27/06* (2006.01)

(52) U.S. Cl.
CPC .................. *H01F 2017/002* (2013.01); *H01F 2017/0073* (2013.01); *H01F 2027/065* (2013.01)

(58) Field of Classification Search
CPC ............... H01F 5/003; H01F 2017/002; H01F 2017/0073; H01F 17/0033; H01F 27/24; H01F 2027/065
USPC .................................................. 336/200, 232
See application file for complete search history.

(56) References Cited

U.S. PATENT DOCUMENTS

2013/0082812 A1* 4/2013 Yoo ......................... H01F 5/003 336/200
2013/0234819 A1* 9/2013 Yoo ..................... H01F 17/0013 336/200
2015/0061805 A1* 3/2015 Eom .................. H01F 27/2847 336/200
2019/0333673 A1* 10/2019 Oomori .................. H01F 27/29

FOREIGN PATENT DOCUMENTS

| | | |
|---|---|---|
| KR | 10-1167789 | 7/2012 |
| KR | 10-2013-0035474 | 4/2013 |
| KR | 10-1251843 | 4/2013 |
| KR | 10-2015-0035947 | 4/2015 |
| WO | WO 2008/105213 | 9/2008 |

* cited by examiner

MAGNETIC ELEMENT AND CIRCUIT BOARD COMPRISING THE SAME

CROSS-REFERENCE TO RELATED PATENT APPLICATIONS

This application is a U.S. National Stage Application under 35 U.S.C. § 371 of PCT Application No. PCT/KR2021/011128, filed Aug. 20, 2021, which claims priority to Korean Patent Application No. 10-2020-0105378, filed Aug. 21, 2020, whose entire disclosures are hereby incorporated by reference.

TECHNICAL FIELD

The present disclosure relates to a magnetic element having a reduced thickness and a circuit board including the same.

BACKGROUND ART

A magnetic element may alternatively be referred to as a magnetic coupling device, and representative examples thereof may include an inductor, a transformer, and an EMI filter in which an inductor and a capacitor are connected to each other. Such a magnetic element may be mounted on any of various types of circuit boards. However, when an EMI filter for a power supply unit of an electronic product is provided, disposition thereof on a circuit board may be problematic depending on operational modes. This will be described with reference FIG. 1.

FIG. 1 is a circuit diagram showing a part of the configuration of an EMI filter.

Although not shown, an EMI filter is configured such that an inductor and a capacitor are connected to each other on a circuit board of an electronic product, i.e. a power board, and serves to pass a signal necessary for operation of a circuit and to remove noise. In this case, noise transmitted from the power board may be broadly classified into radiative noise and conductive noise conducted through a power line.

A conductive noise transmission mode may be classified into a differential mode and a common mode. Among these modes, common-mode noise travels and returns along a large loop. Thus, the common-mode noise may affect electronic devices that are located far away even when the amount thereof is small. Such common-mode noise is generated by impedance imbalance of a wiring system, and becomes remarkable at high frequency. In order to remove common-mode noise, in the EMI filter shown in FIG. 1(*a*), a primary coil L1 and a secondary coil L2 need to be disposed such that input lines thereof, which have the same polarity, are connected to each other. The reason for this is that a magnetic flux is reinforced in the magnetic core when common-mode noise is applied thereto.

However, as electronic products have recently become slimmer, a slim-type EMI filter, in which a primary coil L1 and a secondary coil L2 have a form of a printed circuit board (PCB) and share a center leg of a magnetic core, is widely used. In such a slim-type EMI filter, as shown in FIG. 1(*b*), the primary coil L1 and the secondary coil L2 may be disposed such that input lines having mutually opposite polarities are connected to each other depending on design of a circuit board for meeting the requirement for slim products.

Therefore, when the slim-type EMI filter is used, there is a problem in that the configuration of a conventional circuit board needs to be changed in order to allow the input lines of the primary coil L1 and the secondary coil L2, which have the same polarity, to be connected to each other. This may increase design difficulty compared to a conventional board pattern designed to exhibit optimal efficiency, and may reduce the efficiency of a power supply unit.

DISCLOSURE

Technical Problem

A technical task of the present disclosure is to provide a slim-type EMI filter, which has a further reduced thickness and does not affect the configuration of a circuit board, and a circuit board including the same.

The technical tasks of the present disclosure are not limited to the above-mentioned technical tasks, and other technical tasks not mentioned herein will be clearly understood by those skilled in the art from the following description.

Technical Solution

An EMI filter according to an embodiment may include a core unit including an upper core and a lower core and a coil unit partially disposed inside the core unit and including a first coil unit and a second coil unit. The first coil unit may include a first substrate, a first upper conductive pattern disposed on the upper surface of the first substrate, and a first lower conductive pattern disposed on the lower surface of the first substrate. The second coil unit may include a second substrate, a second upper conductive pattern disposed on the upper surface of the second substrate, and a second lower conductive pattern disposed on the lower surface of the second substrate. The coil unit may include a center portion including a plurality of turns of each of the first upper conductive pattern, the first lower conductive pattern, the second upper conductive pattern, and the second lower conductive pattern, a first pattern lead-out portion disposed on one side of the center portion, the first pattern lead-out portion including one end of each of the first upper conductive pattern and the first lower conductive pattern led out from the center portion, and a second pattern lead-out portion disposed on the opposite side of the center portion, second pattern lead-out portion including one end of each of the second upper conductive pattern and the second lower conductive pattern led out from the center portion. In the second pattern lead-out portion, the second upper conductive pattern and the second lower conductive pattern may overlap each other in a vertical direction such that at least a portion of the second upper conductive pattern and at least a portion of the second lower conductive pattern intersect each other when viewed in a plan view.

In an example, each of the first upper conductive pattern, the first lower conductive pattern, the second upper conductive pattern, and the second lower conductive pattern may have a spiral planar shape.

In an example, the first upper conductive pattern may have a spiral planar shape circling in a first direction when viewed in a plan view, and any one of the second upper conductive pattern and the second lower conductive pattern may have a spiral planar shape circling in the first direction when viewed in a plan view.

In an example, the first lower conductive pattern may have a spiral planar shape circling in a second direction, which is opposite the first direction, when viewed in a plan view, and the remaining one of the second upper conductive pattern and the second lower conductive pattern may have a spiral planar shape circling in the second direction when viewed in a plan view.

In an example, the opposite end of the first upper conductive pattern and the opposite end of the first lower conductive pattern may be electrically connected to each other through a first via hole passing through the first substrate, and the opposite end of the second upper conductive pattern and the opposite end of the second lower conductive pattern may be electrically connected to each other through a second via hole passing through the second substrate.

In an example, in the first pattern lead-out portion, the first upper conductive pattern and the first lower conductive pattern may be spaced apart from each other when viewed in a plan view.

In an example, in the second pattern lead-out portion, the second upper conductive pattern and the second lower conductive pattern may have the same length.

In an example, a deviation between a first total length of the first upper conductive pattern and the first lower conductive pattern and a second total length of the second upper conductive pattern and the second lower conductive pattern may be 5% or less.

In an example, a deviation between a third total length of the first upper conductive pattern and the first lower conductive pattern in the first pattern lead-out portion and a fourth total length of the second upper conductive pattern and the second lower conductive pattern in the second pattern lead-out portion may be 5% or less.

In an example, in the first pattern lead-out portion, at least one of the first upper conductive pattern or the first lower conductive pattern may have a curved planar shape having a curvature at a point at which the first upper conductive pattern and the first lower conductive pattern are closest to each other when viewed in a plan view.

In an example, in the first pattern lead-out portion, at least one of the first upper conductive pattern or the first lower conductive pattern may have a vertex forming an inflection at a point at which the first upper conductive pattern and the first lower conductive pattern are closest to each other when viewed in a plan view and a bridge portion disposed near the vertex.

A circuit board according to an embodiment of the present disclosure may include a board, a circuit unit formed on the board, and an EMI filter electrically connected to the circuit unit. The EMI filter may include an inductor and a capacitor. The inductor may include a core unit including an upper core and a lower core and a coil unit partially disposed inside the core unit and including a first coil unit and a second coil unit. The first coil unit may include a first substrate, a first upper conductive pattern disposed on the upper surface of the first substrate, and a first lower conductive pattern disposed on the lower surface of the first substrate. The second coil unit may include a second substrate, a second upper conductive pattern disposed on the upper surface of the second substrate, and a second lower conductive pattern disposed on the lower surface of the second substrate. The coil unit may include a center portion formed to allow each of the first upper conductive pattern, the first lower conductive pattern, the second upper conductive pattern, and the second lower conductive pattern to form a plurality of turns, a first pattern lead-out portion disposed on one side of the center portion and formed to allow one end of each of the first upper conductive pattern and the first lower conductive pattern to be led out from the center portion, and a second pattern lead-out portion disposed on the opposite side of the center portion and formed to allow one end of each of the second upper conductive pattern and the second lower conductive pattern to be led out from the center portion. In the second pattern lead-out portion, the second upper conductive pattern and the second lower conductive pattern may overlap each other in a vertical direction such that at least a portion of the second upper conductive pattern and at least a portion of the second lower conductive pattern intersect each other when viewed in a plan view.

In an example, in the first pattern lead-out portion, the first upper conductive pattern and the first lower conductive pattern may be spaced apart from each other when viewed in a plan view.

In an example, a deviation between a first total length of the first upper conductive pattern and the first lower conductive pattern and a second total length of the second upper conductive pattern and the second lower conductive pattern may be 5% or less.

In an example, a deviation between a third total length of the first upper conductive pattern and the first lower conductive pattern in the first pattern lead-out portion and a fourth total length of the second upper conductive pattern and the second lower conductive pattern in the second pattern lead-out portion may be 5% or less.

Advantageous Effects

In an EMI filter and a circuit board including the same according to embodiments, at least one coil unit has an intersection pattern, and thus polarity matching for connection between a primary coil and a secondary coil may be facilitated.

In addition, when both coil units of an EMI filter have intersection patterns, even if a single EMI filter is disposed on a circuit board, a problem attributable to inductance asymmetry does not occur.

The effects achievable through the present disclosure are not limited to the above-mentioned effects, and other effects not mentioned herein will be clearly understood by those skilled in the art from the following description.

BEST MODE

Figure 1:
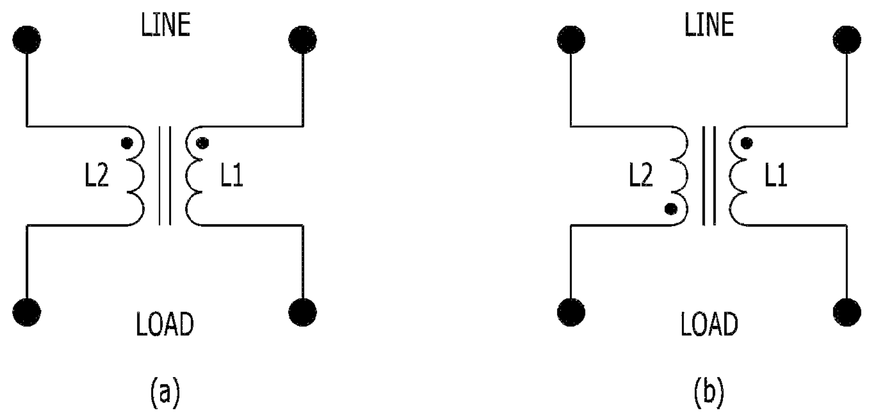
FIGS. 1 (*a*) and (*b*) are circuit diagrams showing a part of the configuration of an EMI filter.

The present disclosure will now be described more fully hereinafter with reference to the accompanying drawings, in which various embodiments are shown. The examples, however, may be embodied in many different forms and should not be construed as being limited to the embodiments set forth herein. It is to be understood that the present disclosure covers all modifications, equivalents, and alternatives falling within the scope and spirit of the present disclosure.

While ordinal numbers including "second", "first", etc. may be used to describe various components, they are not intended to limit the components. These expressions are used only to distinguish one component from another component. For example, a second element could be termed a first element, and, similarly, a first element could be termed a second element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

In the description of the embodiments, it will be understood that when an element, such as a layer (film), a region, a pattern or a structure, is referred to as being "on" or "under" another element, such as a substrate, a layer (film), a region, a pad or a pattern, the term "on" or "under" means that the element is "directly" on or under another element or is "indirectly" formed such that an intervening element may also be present. It will also be understood that criteria of on or under is on the basis of the drawing. In addition, the thickness or size of a layer (film), a region, a pattern or a structure shown in the drawings may be exaggerated, omitted or schematically drawn for the clarity and convenience of explanation, and may not accurately reflect the actual size.

The terminology used herein is for the purpose of describing particular embodiments only and is not intended to be limiting of exemplary embodiments of the disclosure. As used herein, the singular forms are intended to include the plural forms as well, unless the context clearly indicates otherwise. It will be further understood that the term "include" or "have", when used herein, specifies the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, embodiments will be described in detail with reference to the accompanying drawings, and the same or equivalent elements are denoted by the same reference numerals even when they are depicted in different drawings, and redundant descriptions thereof will be omitted. In addition, some embodiments will be described using a coordinate system. In the coordinate system, a first axis, a second axis, and a third axis shown in each drawing are perpendicular to each other, but the embodiments are not limited thereto. The first axis, the second axis, and the third axis may intersect each other obliquely.

Hereinafter, an EMI filter according to an embodiment will be described in detail with reference to the accompanying drawings.

Figure 2:
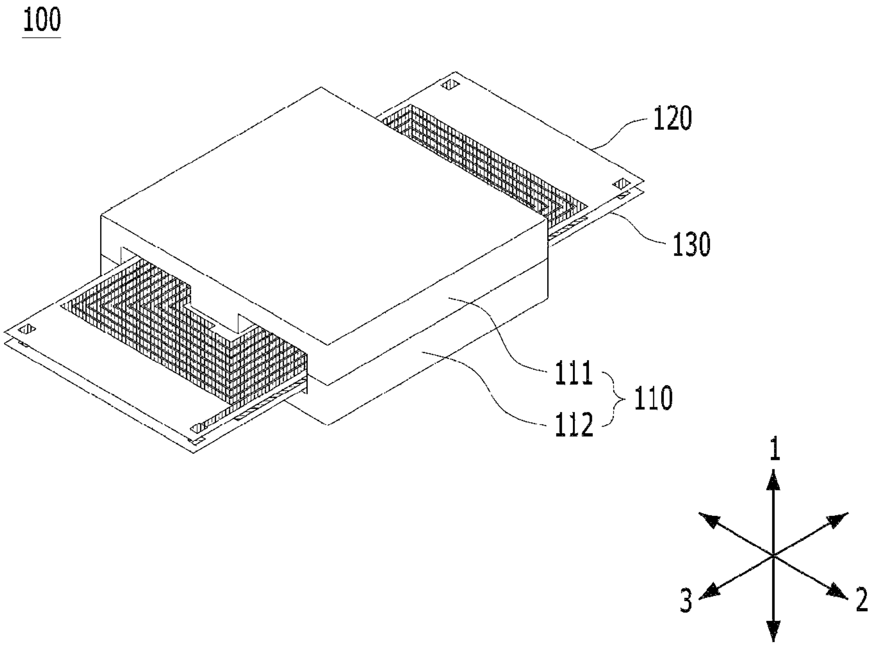
FIG. 2 is a perspective view of an EMI filter according to an embodiment.
Figure 3:
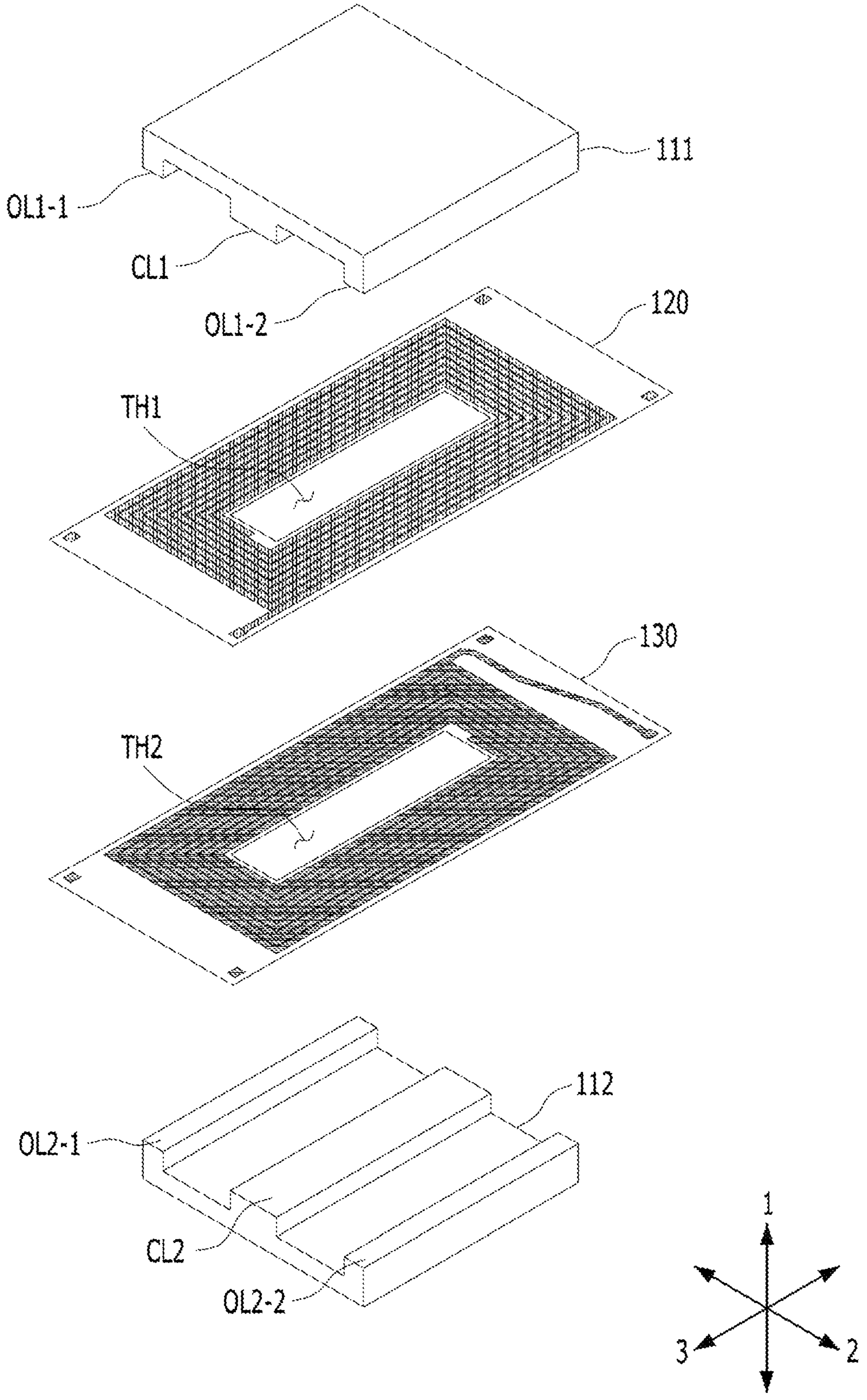
FIG. 3 is an exploded perspective view of an EMI filter according to an embodiment.

FIG. 2 is a perspective view of an EMI filter according to an embodiment, and FIG. 3 is an exploded perspective view of an EMI filter according to an embodiment.

Referring to FIGS. 2 and 3 together, an EMI filter 100 according to an embodiment may include a core unit 110 and coil units 120 and 130. Hereinafter, respective components will be described in detail.

The core units 111 and 112 may have the function of a magnetic circuit, and thus may serve as a path for magnetic flux. The core units 111 and 112 may include an upper core 111, which is disposed at an upper position, and a lower core 112, which is disposed at a lower position. The two cores 111 and 112 may be formed to be symmetrical or asymmetrical with each other in the vertical direction, or any one of the upper core 111 and the lower core 112 may be omitted. However, for convenience of explanation, the following description will be given on the assumption that the two cores are formed to be vertically symmetrical with each other.

Each of the upper core 111 and the lower core 112 may include a body portion, which has a flat plate shape, and a plurality of leg portions OL1-1, OL1-2, OL2-1, OL2-2, CL1, and CL2, which protrude from the body portion in a first direction (i.e. the first-axis direction) and extend in a predetermined direction. For example, the plurality of leg portions OL1-1, OL1-2, and CL1 of the upper core 111 may include two outer legs OL1-1 and OL1-2, which are disposed so as to be spaced apart from each other in a second direction (i.e. the second-axis direction), which intersects the first direction when viewed in a plan view, and one center leg CL1, which is disposed between the two outer legs OL1-1 and OL1-2. In addition, each of the plurality of leg portions OL1-1, OL1-2, OL2-1, OL2-2, CL1, and CL2 may extend in a third direction (i.e. the third-axis direction), which intersects the first and second directions when viewed in a plan view.

When the upper core 111 and the lower core 112 are coupled to each other in the vertical direction, each of the outer legs OL1-1 and OL1-2 and the center leg CL1 of the upper core 111 faces a corresponding one of the outer legs OL2-1 and OL2-2 and the center leg CL2 of the lower core 112. One pair of outer legs OL1-1 and OL2-1, which face each other, may be referred to as first outer leg portions, the other pair of outer legs OL1-2 and OL2-2, which face each other, may be referred to as second outer leg portions, and the pair of center legs CL1 and CL2, which face each other, may be referred to as center leg portions.

A gap having a predetermined distance (e.g. 10 to 200 μm, without being limited thereto) may be formed between at least one pair among the pairs of outer legs and the pair of center legs, which face each other. The sizes of the gaps between the one pair of center legs and between each of the two pairs of outer legs may be adjusted in order to control the inductance of the core unit 110, and the amount of heat that is generated may be controlled by varying the number of gaps.

In addition, the core unit 110 may include a magnetic material, for example, iron or ferrite, but the disclosure is not limited thereto.

Because the core unit 110 surrounds a portion of each of the coil units 120 and 130, it can be seen that a portion of each of a primary coil unit 120 and a secondary coil unit 130, which constitute the coil units 120 and 130, is disposed inside the core unit 110.

The primary coil unit 120 and the secondary coil unit 130 may respectively have a first through-hole TH1 and a second through-hole TH2 formed in the center portions thereof, and the center legs CL1 and CL2 of the core unit 110 may pass through the first through-hole TH1 and the second through-hole TH2. That is, when viewed in a plan view, the primary coil unit 120 and the secondary coil unit 130 may be aligned with each other around the center legs CL1 and CL2 passing through the first through-hole TH1 and the second through-hole TH2.

Each of the primary coil unit 120 and the secondary coil unit 130 may be configured such that a conductive pattern is printed on each of the upper surface and the lower surface of a flat-plate-type substrate having a quadrangular planar shape so as to form a plurality of turns.

The configuration of the primary coil unit 120 and the secondary coil unit 130 will be described in more detail with reference to FIGS. 4A to 5B.

Figure 4A:
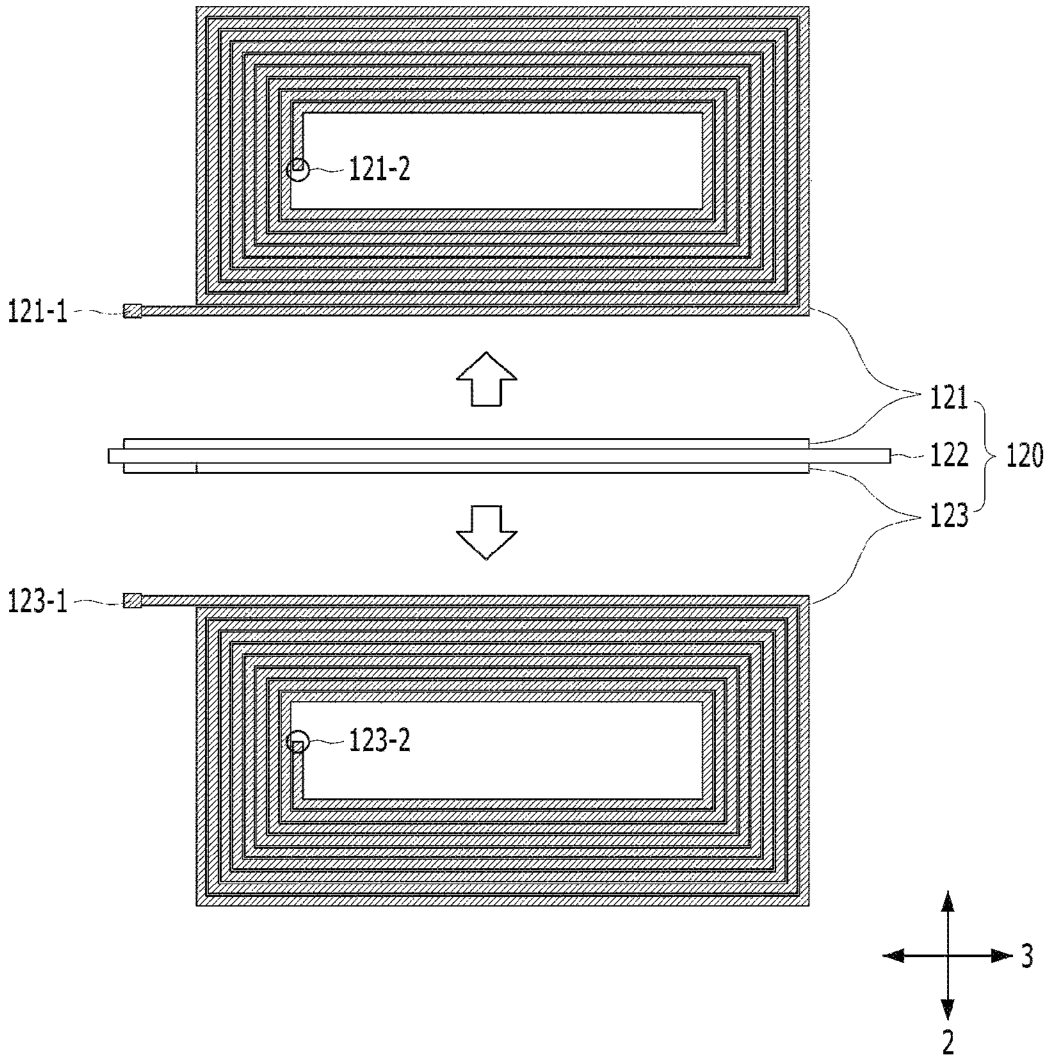
FIGS. 4A and 4B show an example of the configuration of a primary coil unit according to an embodiment.
Figure 4B:
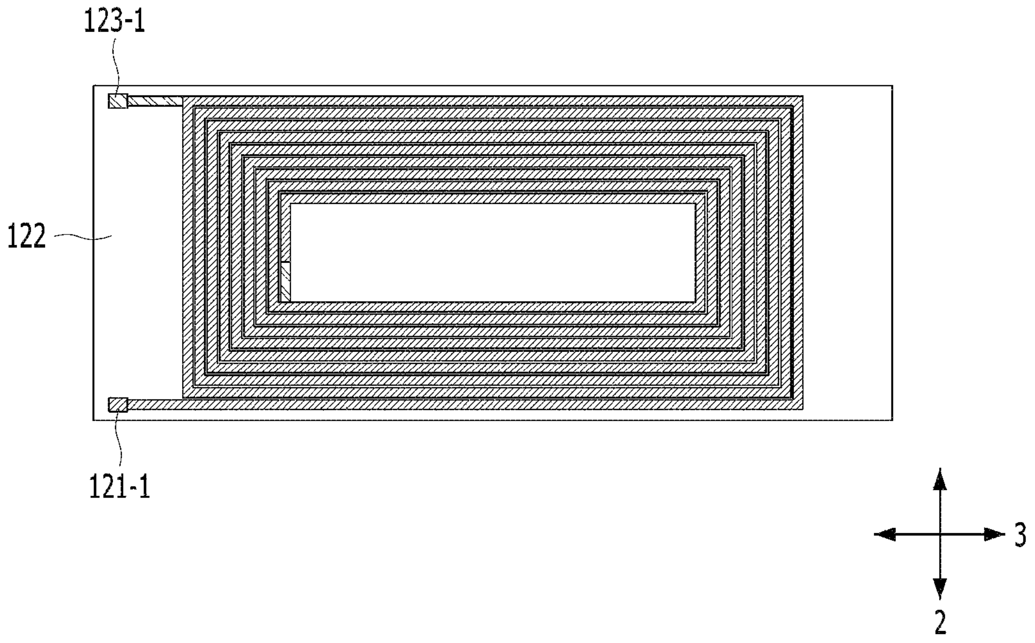

FIGS. 4A and 4B show an example of the configuration of a primary coil unit according to an embodiment.

In FIG. 4A, the intermediate drawing is a side view of the primary coil unit 120, the upper drawing is a plan view of a first upper conductive pattern 121, and the lower drawing is a plan view of a first lower conductive pattern 123. In addition, FIG. 4B is a plan view of the primary coil unit, in which the first upper conductive pattern 121 and the first lower conductive pattern 123 are illustrated as overlapping each other when viewed in a plan view for better understanding.

Referring to FIGS. 4A and 4B, the primary coil unit 120 may include a first substrate 122, a first upper conductive pattern 121 disposed on the upper surface of the first substrate 122, and a first lower conductive pattern 123 disposed on the lower surface of the first substrate 122.

Each of the first upper conductive pattern 121 and the first lower conductive pattern 123 may have a spiral planar shape, and may form a plurality of turns.

One end 121-1 of the first upper conductive pattern 121 is disposed on an edge portion of the substrate 122, and the other end 121-2 thereof is disposed at the innermost position in the spiral pattern. That is, the first upper conductive pattern 121 may extend from one end 121-1 thereof disposed on an edge portion of the substrate 122 in the long-axis direction of the substrate (i.e. the third direction), and then may extend to the other end 121-2 thereof in the inward direction from the outside while forming a spiral pattern.

In addition, one end 123-1 of the first lower conductive pattern 123 is disposed on an edge portion of the substrate 122, and the other end 123-2 thereof is disposed at the innermost position in the spiral pattern.

In addition, the spiral direction of the first upper conductive pattern 121 and the spiral direction of the first lower conductive pattern 123 may be opposite each other. For example, the first upper conductive pattern 121 may have a spiral pattern that circles from one end 121-1 thereof to the other end 121-2 thereof in the counterclockwise direction, and the first lower conductive pattern 123 may have a spiral pattern that circles from one end 123-1 thereof to the other end 123-2 thereof in the clockwise direction.

Here, at least a portion of the other end 121-2 of the first upper conductive pattern 121 and at least a portion of the other end 123-2 of the first lower conductive pattern 123 may overlap each other when viewed in a plan view, and may be electrically connected to each other through a via hole formed through the substrate 122.

In the case in which one end 123-1 of the first lower conductive pattern 123 is an input terminal of a primary current and one end 121-1 of the first upper conductive pattern 121 is an output terminal of the primary current, the primary current flows consistently through the primary coil unit 120 in one direction (i.e. the clockwise direction) due to the above-described electrical connection through the via hole and the spiral patterns that circle in opposite directions.

Meanwhile, one end 121-1 of the first upper conductive pattern 121 and one end 123-1 of the first lower conductive pattern 123 may be spaced apart from each other in the short-axis direction of the substrate 122 (i.e. the second direction or the second-axis direction), and may have the same extension length in the long-axis direction of the substrate 122 (i.e. the third direction or the third-axis direction).

Figure 5A:
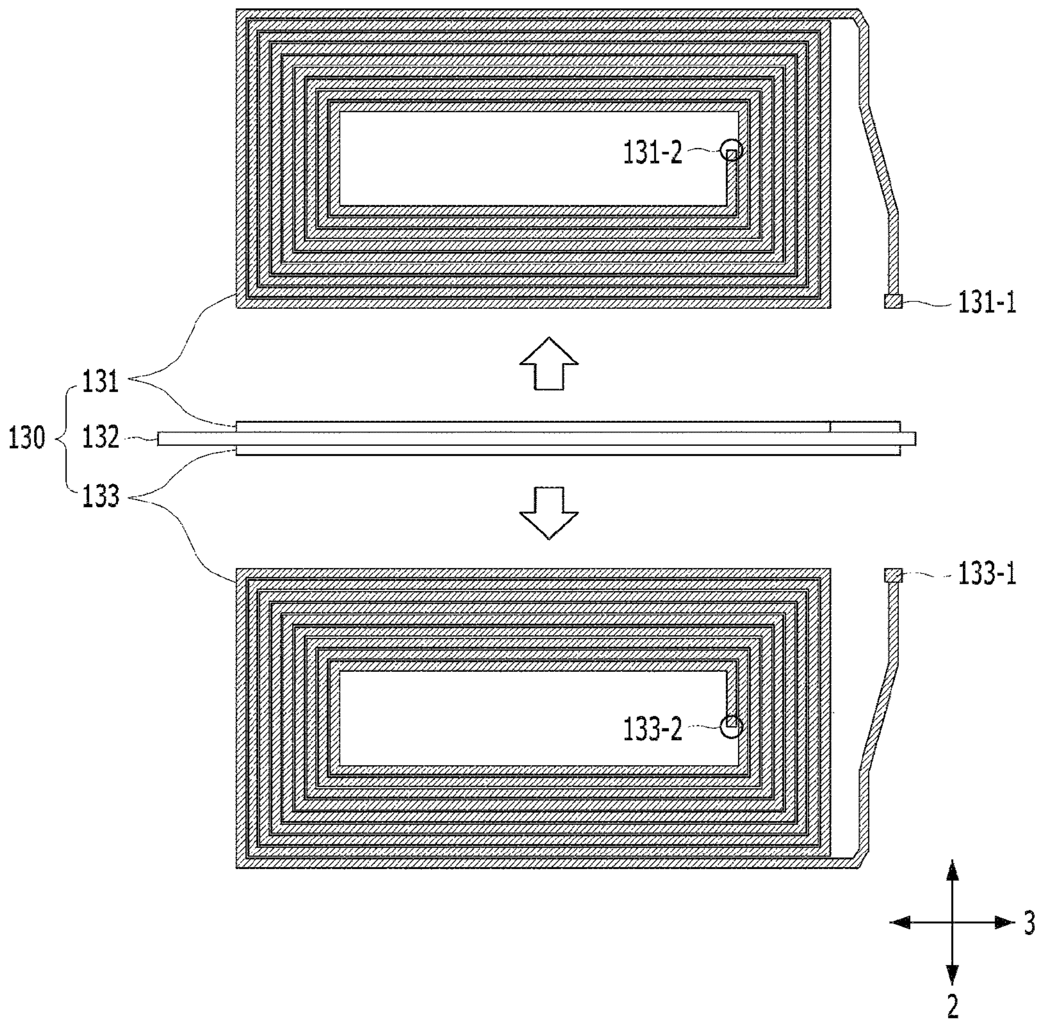
FIGS. 5A and 5B show an example of the configuration of a secondary coil unit according to an embodiment.
Figure 5B:
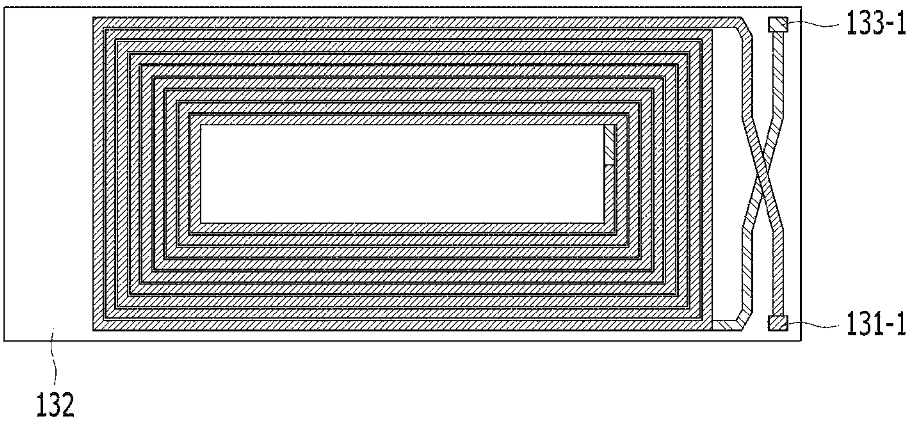

FIGS. 5A and 5B show an example of the configuration of a secondary coil unit according to an embodiment.

Similar to the drawings in FIG. 4A, in FIG. 5A, the intermediate drawing is a side view of the secondary coil unit 130, the upper drawing is a plan view of a secondary upper conductive pattern 131, and the lower drawing is a plan view of a secondary lower conductive pattern 133. In addition, FIG. 5B is a plan view of the secondary coil unit, in which the second upper conductive pattern 131 and the second lower conductive pattern 133 are illustrated as overlapping each other when viewed in a plan view for better understanding.

Referring to FIGS. 5A and 5B, the secondary coil unit 130 may include a second substrate 132, a second upper conductive pattern 131 disposed on the upper surface of the second substrate 132, and a second lower conductive pattern 133 disposed on the lower surface of the second substrate 132.

Each of the second upper conductive pattern 131 and the second lower conductive pattern 133 may have a spiral planar shape, and may form a plurality of turns.

One end 131-1 of the second upper conductive pattern 131 is disposed on an edge portion of the substrate 132, and the other end 131-2 thereof is disposed at the innermost position in the spiral pattern. Here, the second upper conductive pattern 131 may extend from one end 131-1 thereof disposed on an edge portion of the substrate 132, and then may extend to the other end 131-2 thereof in the inward direction from the outside while forming a spiral pattern.

In addition, one end 133-1 of the second lower conductive pattern 133 is disposed on an edge portion of the substrate 132, and the other end 133-2 thereof is disposed at the innermost position in the spiral pattern.

In addition, the spiral direction of the second upper conductive pattern 131 and the spiral direction of the second lower conductive pattern 133 may be opposite each other. For example, the second upper conductive pattern 131 may have a spiral pattern that circles from one end 131-1 thereof to the other end 131-2 thereof in the counterclockwise direction, and the second lower conductive pattern 133 may have a spiral pattern that circles from one end 133-1 thereof to the other end 133-2 thereof in the clockwise direction.

Here, at least a portion of the other end 131-2 of the second upper conductive pattern 131 and at least a portion of the other end 133-2 of the second lower conductive pattern 133 may overlap each other when viewed in a plan view, and may be electrically connected to each other through a via hole formed through the substrate 132.

In the case in which one end 133-1 of the second lower conductive pattern 133 is an input terminal of a secondary current and one end 131-1 of the second upper conductive pattern 131 is an output terminal of the secondary current, the secondary current flows consistently through the secondary coil unit 130 in one direction (i.e. the clockwise direction) due to the above-described electrical connection through the via hole and the spiral patterns that circle in opposite directions.

Meanwhile, one end 131-1 of the second upper conductive pattern 131 and one end 133-1 of the second lower conductive pattern 133 may be spaced apart from each other in the short-axis direction of the substrate 132 (i.e. the second direction or the second-axis direction). Each of one end 121-1 of the first upper conductive pattern 121 and one end 123-1 of the first lower conductive pattern 123 extends straight in the third direction, whereas each of one end 131-1 of the second upper conductive pattern 131 and one end 133-1 of the second lower conductive pattern 133 extends in the third direction to a position located opposite the disposition position thereof in the second direction, and then extends so as to form turns. Therefore, at least a portion of the second upper conductive pattern 131 and at least a portion of the second lower conductive pattern 133 may overlap each other before the turns are formed when viewed in a plan view. In other words, the second upper conductive pattern 131 and the second lower conductive pattern 133 have portions intersecting each other before forming the turns when viewed in a plan view. Accordingly, the second upper conductive pattern 131 and the second lower conductive pattern 133 of the secondary coil unit 130 may be said to have an "intersection pattern."

Figure 6:
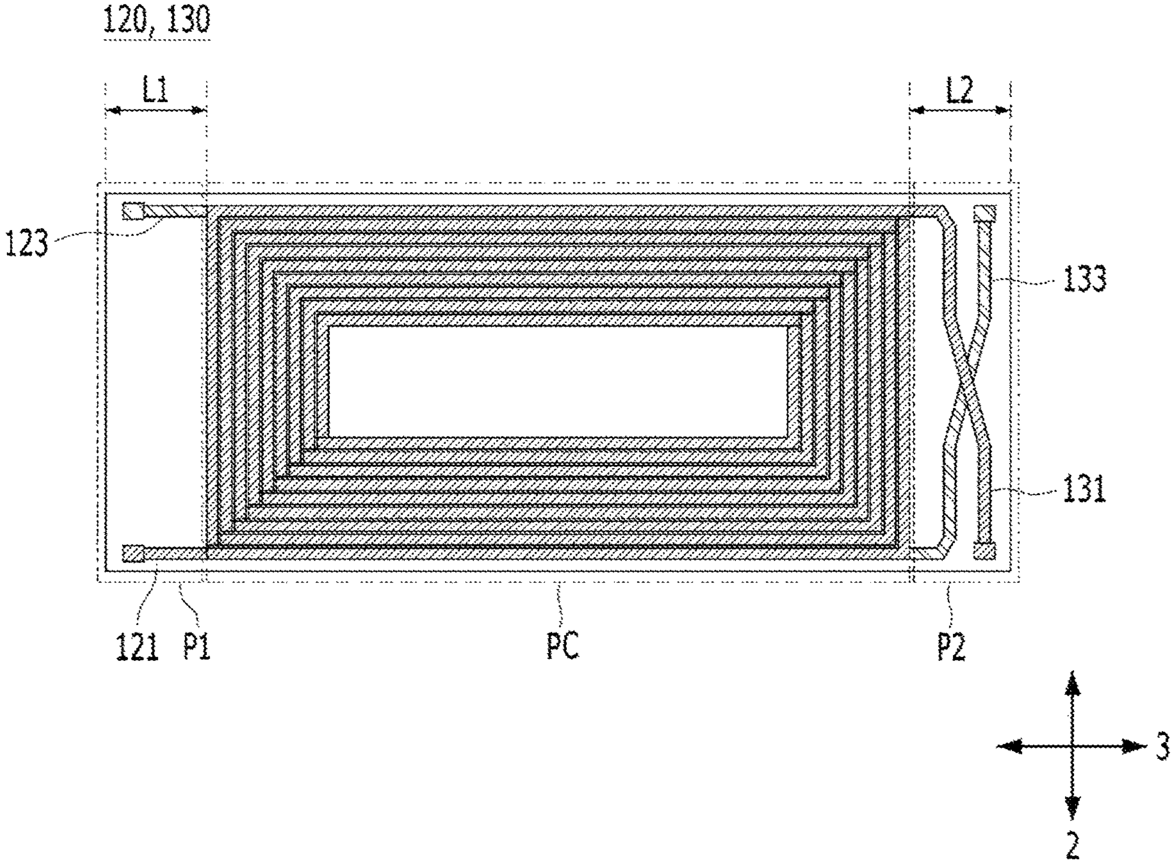
FIG. 6 is a plan view showing an example of the configuration of a coil unit according to an embodiment.

FIG. 6 is a plan view showing an example of the configuration of a coil unit according to an embodiment.

In FIG. 6, the primary coil unit 120 and the secondary coil unit 130 are illustrated as overlapping each other when viewed in a plan view.

Referring to FIG. 6, each of the coil units 120 and 130 may include a center portion PC, in which the first upper conductive pattern 121, the first lower conductive pattern 123, the second upper conductive pattern 131, and the second lower conductive pattern 133 form turns, a primary pattern lead-out portion P1, which is located on one side of the center portion PC in the long-axis direction of the coil units 120 and 130 (i.e. the third direction or the third-axis direction), and a secondary pattern lead-out portion P2, which is located on the opposite side of the center portion PC in the long-axis direction of the coil units 120 and 130.

It is preferable that the length L1 of the primary pattern lead-out portion P1 and the length L2 of the secondary pattern lead-out portion P2 be equal to each other in the third direction. However, this is merely illustrative, and the length L1 of the primary pattern lead-out portion P1 and the length L2 of the secondary pattern lead-out portion P2 may be different from each other.

For example, in the primary pattern lead-out portion P1, the length of the first upper conductive pattern 121 and the length of the first lower conductive pattern 123 may be equal to each other.

In addition, in the secondary pattern lead-out portion P2, the length of the second upper conductive pattern 131 and the length of the second lower conductive pattern 133 may be equal to each other.

Meanwhile, referring to FIG. 6, in the secondary pattern lead-out portion P2, the second upper conductive pattern 131 and the second lower conductive pattern 133 are symmetrical with each other in the second direction so as to form an X-shaped intersection pattern. However, this is merely illustrative, and the second upper conductive pattern 131 and the second lower conductive pattern 133 are not necessarily symmetrical with each other in the secondary pattern lead-out portion P2.

The effect achievable through the configuration of the coil units 120 and 130 described above with reference to FIGS. 4 to 6 will be described with reference to FIG. 7.

Figure 7:
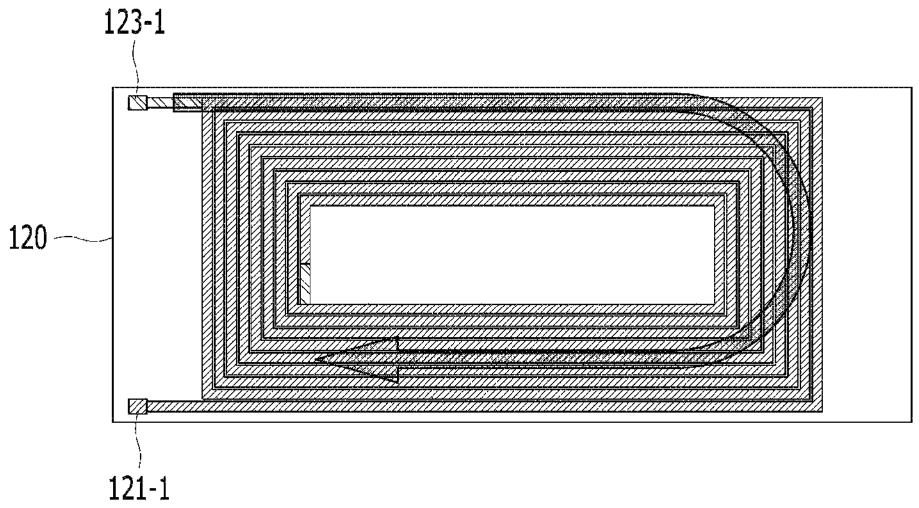
FIG. 7 is a view for explaining the effect achievable through an intersection pattern of a secondary coil unit according to an embodiment.
Figure 7:
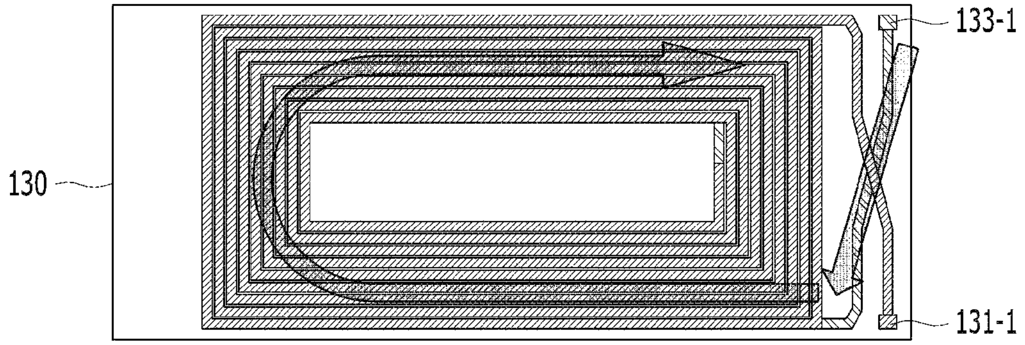

FIG. 7 is a view for explaining the effect achievable through the intersection pattern of the secondary coil unit according to the embodiment.

In FIG. 7, the upper drawing is a plan view of the primary coil unit 120, and the lower drawing is a plan view of the secondary coil unit 130.

Similar to what is shown in FIG. 1(*a*), in the configuration shown in FIG. 7, it is assumed that one end 123-1 of the primary lower conductive pattern 123 serves as a primary input terminal, one end 121-1 of the primary upper conductive pattern 121 serves as a primary output terminal, one end 133-1 of the secondary lower conductive pattern 133 serves as a secondary input terminal, and one end 131-1 of the secondary upper conductive pattern 131 serves as a secondary output terminal.

In this case, as shown in FIG. 7, the primary current and the secondary current flow in the same direction (here, the clockwise direction). Therefore, when the EMI filter 100 functions as a common mode choke, the input lines of the primary coil L1 and the secondary coil L2, which have the same polarity, may be connected to each other even in the circuit configuration of the conventional board. As a result, the EMI filter 100 according to the embodiment allows the circuit of the board to be constructed in such a manner that conventional general conductive wires are wound.

The embodiment has been described as being configured such that only the lead-out portion of the secondary coil unit 130 has an intersection pattern. However, in some embodiments, only the lead-out portion of the primary coil unit 120 may have an intersection pattern.

Figure 8:
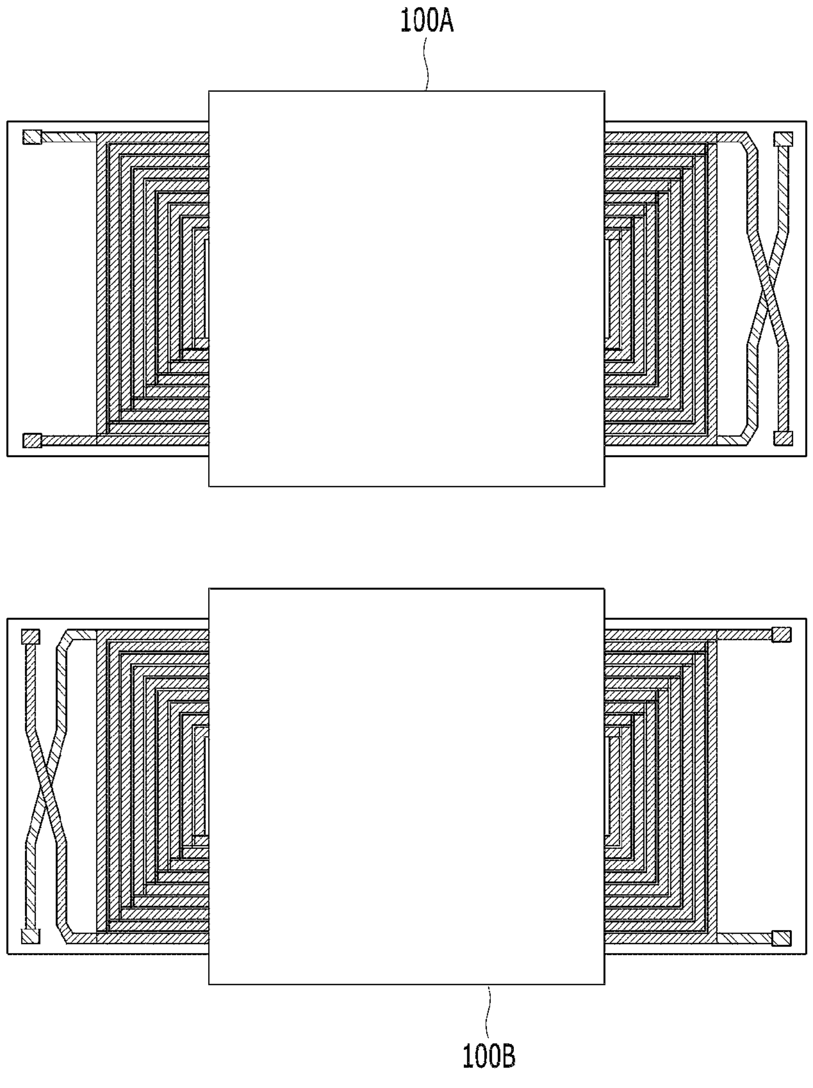
FIG. 8 shows an example of the configuration concept of a circuit using an EMI filter according to an embodiment.

FIG. 8 shows an example of the configuration concept of a circuit using the EMI filter according to the embodiment.

In the EMI filter 100 according to the embodiment, the length of the conductive pattern in the pattern lead-out portion of one coil unit having the intersection pattern among the primary coil unit 120 and the secondary coil unit 130 is longer than that of the remaining coil unit having no intersection pattern. Therefore, the inductance of the coil unit having the intersection pattern may relatively increase, which may lead to inductance asymmetry between the primary side and the secondary side. Accordingly, when the magnetic element is driven, the coil unit having the intersection pattern acts as an additional heat generation channel, thus deteriorating the efficiency of the magnetic element. In order to solve this problem, as shown in FIG. 8, when the EMI filter 100 according to the embodiment is provided as an even number of EMI filters 100A and 100B, which are disposed in series, the combined inductance of the entire circuit board may be symmetrical. That is, inductance matching may be realized by disposing the EMI filters 100A and 100B in series such that the input terminal and the output terminal of the combination thereof are symmetrical with each other.

Meanwhile, another embodiment of the present disclosure proposes an EMI filter capable of solving inductance asymmetry caused by the above-described intersection pattern.

Figure 9:
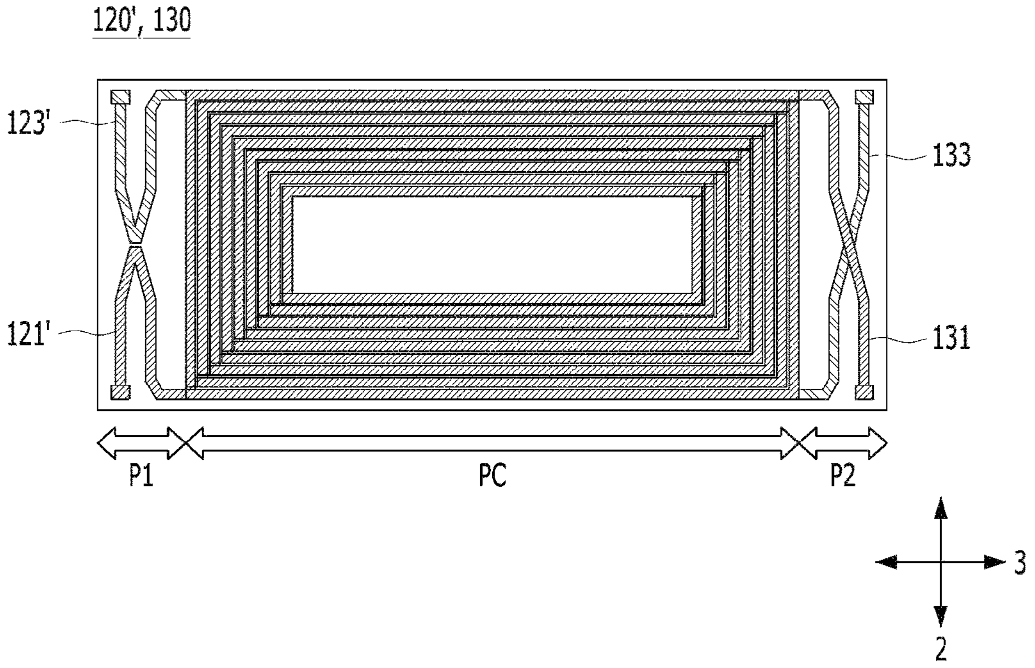
FIG. 9 is a plan view showing an example of the configuration of a coil unit according to another embodiment.
Figure 10:
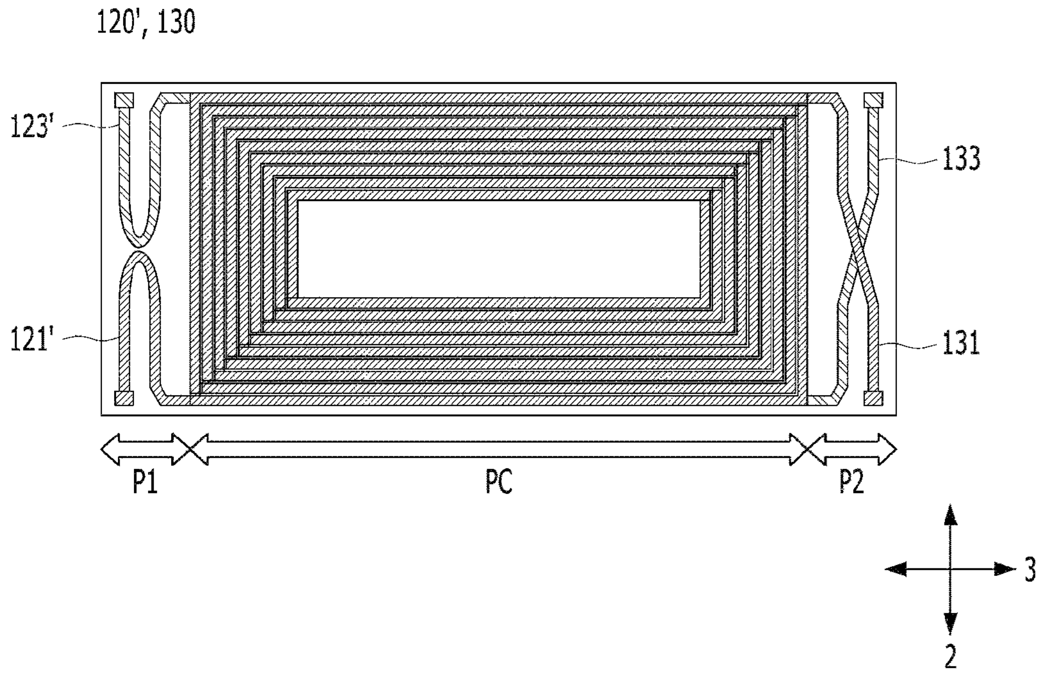
FIG. 10 is a plan view showing another example of the configuration of the coil unit according to the other embodiment.
Figure 11:
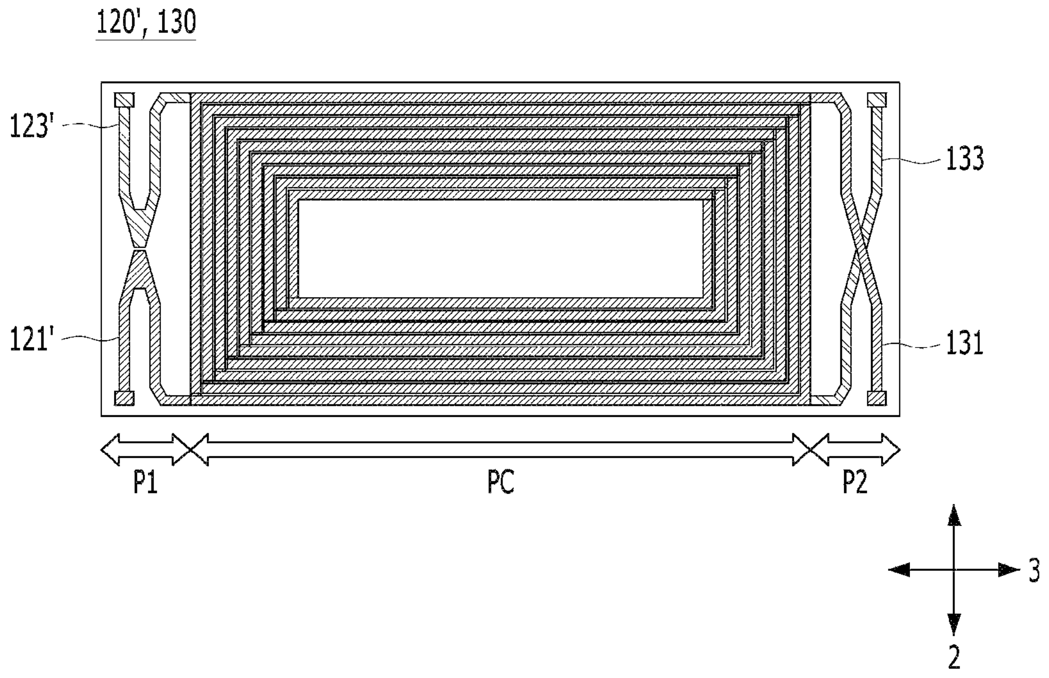
FIG. 11 shows still another example of the configuration of the coil unit according to the other embodiment.

FIGS. 9 to 11 are plan views showing examples of the configuration of a coil unit according to another embodiment.

In FIGS. 9 to 11, a primary coil unit 120' and a secondary coil unit 130 are illustrated as overlapping each other when viewed in a plan view.

Referring to FIG. 9, among the coil units 120' and 130 according to the other embodiment, the secondary coil unit 130 has the same configuration as described above with reference to FIG. 5. However, unlike the configuration shown in FIG. 4, each of a first upper conductive pattern 121' and a first lower conductive pattern 123', which constitute the primary coil unit 120', is curved or bent in a predetermined shape in a primary pattern lead-out portion P1, rather than extending straight in the third direction, and then is connected to the center portion PC. Here, the curved or bent point may be a point at which the first upper conductive pattern 121' and the first lower conductive pattern 123' are closest to each other when viewed in a plan view. When the conductive pattern is bent, the same may have a vertex forming an inflection. In this case, the planar shapes of the first upper conductive pattern 121' and the first lower conductive pattern 123' in the primary pattern lead-out portion P1 are illustrated as being similarly symmetrical with those of the second upper conductive pattern 131 and the second lower conductive pattern 133 in the secondary pattern lead-out portion P2. However, this is merely illustrative, and the conductive patterns located in the primary pattern lead-out portion P1 and the conductive patterns located in the secondary pattern lead-out portion P2 are not necessarily formed to be symmetrical with each other. However, in order to realize inductance matching, it is preferable that the total length of the first upper conductive pattern 121' and the first lower conductive pattern 123' and the total length of the second upper conductive pattern 131 and the second lower conductive pattern 133 be equal to each other. In this case, it is confirmed that deterioration in the efficiency of the magnetic element is insignificant when a deviation between the total length of the first upper conductive pattern 121' and the first lower conductive pattern 123' and the total length of the second upper conductive pattern 131 and the second lower conductive pattern 133 is 5% or less, and thus such a deviation is considered to be encompassed in the concept that the total lengths are equal to each other. However, when the deviation between the total lengths is 3% or less, more preferably 1% or less, the inductance difference may become smaller, and thus fine tuning of inductance matching may be further facilitated. For example, in the center portion PC, the first upper conductive pattern 121', the first lower conductive pattern 123', the second upper conductive pattern 131, and the second lower conductive pattern 133 may have the same length. In this case, the sum of the length of the first upper conductive pattern 121' and the length of the first lower conductive pattern 123' in the first pattern lead-out portion P1 may be equal to the sum of the length of the second upper conductive pattern 131 and the length of the second lower conductive pattern 133 in the second pattern lead-out portion P2.

In addition, in the second pattern lead-out portion P2, the second upper conductive pattern 131 and the second lower conductive pattern 133 may form an intersection pattern in such a manner that at least a portion of the second upper conductive pattern 131 and at least a portion of the second lower conductive pattern 133 overlap each other in the first direction when viewed in a plan view. However, in the first pattern lead-out portion P1, the first upper conductive pattern 121' and the first lower conductive pattern 123' may be spaced apart from each other without overlapping each other in the first direction when viewed in a plan view.

Referring to FIG. 10 showing another embodiment, the first upper conductive pattern 121' and the first lower conductive pattern 123' in the first pattern lead-out portion P1 may not overlap each other in the first direction when viewed in a plan view, and at least one of the first upper conductive pattern 121' or the first lower conductive pattern 123' in the first pattern lead-out portion P1 may be formed such that the bent portion thereof is curved at a predetermined curvature under the condition that the total length of the first upper conductive pattern 121' and the first lower conductive pattern 123' and the total length of the second upper conductive pattern 131 and the second lower conductive pattern 133 are equal to each other. For example, at least one of the first upper conductive pattern 121' or the first lower conductive pattern 123' may be formed such that the vertex thereof, at which the first upper conductive pattern 121' and the first lower conductive pattern 123' are closest to each other, has a curved shape.

In addition, referring to FIG. 11, the first upper conductive pattern 121' and the first lower conductive pattern 123' in the first pattern lead-out portion P1 may not overlap each other in the first direction when viewed in a plan view, and at least one of the first upper conductive pattern 121' or the first lower conductive pattern 123' in the first pattern lead-out portion P1 may be formed such that a bridge portion is formed between portions thereof forming the vertex, at which the first upper conductive pattern 121' and the first lower conductive pattern 123' are closest to each other, in order to increase the area thereof under the condition that the total length of the first upper conductive pattern 121' and the first lower conductive pattern 123' and the total length of the second upper conductive pattern 131 and the second lower conductive pattern 133 are equal to each other. For example, the bridge portion may be disposed near the vertex forming an inflection so as to fill at least a portion of the space between two sides extending from the vertex. Accordingly, electric charges may more smoothly flow in this region.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

The invention claimed is:

1. An inductor, comprising:

a core unit including an upper core and a lower core; and a coil unit partially disposed inside the core unit, the coil unit including a first coil unit and a second coil unit, wherein the first coil unit comprises:

a first substrate;

a first upper conductive pattern disposed on an upper surface of the first substrate; and a first lower conductive pattern disposed on a lower surface of the first substrate, wherein the second coil unit comprises:

a second substrate;

a second upper conductive pattern disposed on an upper surface of the second substrate; and a second lower conductive pattern disposed on a lower surface of the second substrate, wherein the coil unit comprises:

a center portion including a plurality of turns of each of the first upper conductive pattern, the first lower conductive pattern, the second upper conductive pattern, and the second lower conductive pattern;

a first pattern lead-out portion disposed on one side of the center portion, the first pattern lead-out portion including one end of each of the first upper conductive pattern and the first lower conductive pattern led out from the center portion; and a second pattern lead-out portion disposed on an opposite side of the center portion, the second pattern lead-out portion including one end of each of the second upper conductive pattern and the second lower conductive pattern led out from the center portion, and wherein, in the second pattern lead-out portion, the second upper conductive pattern and the second lower conductive pattern overlap each other in a vertical direction such that at least a portion of the second upper conductive pattern and at least a portion of the second lower conductive pattern intersect each other when viewed in a plan view.

2. The inductor according to claim 1, wherein each of the first upper conductive pattern, the first lower conductive pattern, the second upper conductive pattern, and the second lower conductive pattern has a spiral planar shape.

3. The inductor according to claim 2, wherein the first upper conductive pattern has the spiral planar shape circling in a first direction when viewed in the plan view, and wherein any one of the second upper conductive pattern and the second lower conductive pattern has the spiral planar shape circling in the first direction when viewed in the plan view.

4. The inductor according to claim 3, wherein the first lower conductive pattern has the spiral planar shape circling in a second direction when viewed in the plan view, the second direction being opposite the first direction, and wherein a remaining one of the second upper conductive pattern and the second lower conductive pattern has the spiral planar shape circling in the second direction when viewed in the plan view.

5. The inductor according to claim 2, wherein an opposite end of the first upper conductive pattern and an opposite end of the first lower conductive pattern are configured to be electrically connected to each other through a first via hole passing through the first substrate, and wherein an opposite end of the second upper conductive pattern and an opposite end of the second lower conductive pattern are configured to be electrically connected to each other through a second via hole passing through the second substrate.

6. The inductor according to claim 1, wherein, in the first pattern lead-out portion, the first upper conductive pattern and the first lower conductive pattern are spaced apart from each other when viewed in the plan view.

7. The inductor according to claim 1, wherein, in the second pattern lead-out portion, the second upper conductive pattern and the second lower conductive pattern have a same length.

8. The inductor according to claim 1, wherein a deviation between a first total length of the first upper conductive pattern and the first lower conductive pattern and a second total length of the second upper conductive pattern and the second lower conductive pattern is 5% or less.

9. The inductor according to claim 8, wherein, in the first pattern lead-out portion, at least one of the first upper conductive pattern or the first lower conductive pattern has a curved planar shape having a curvature at a point at which the first upper conductive pattern and the first lower conductive pattern are closest to each other when viewed in the plan view.

10. The inductor according to claim 8, wherein, in the first pattern lead-out portion, at least one of the first upper conductive pattern or the first lower conductive pattern includes a vertex forming an inflection at a point at which the first upper conductive pattern and the first lower conductive pattern are closest to each other when viewed in a plan view and a bridge portion disposed near the vertex.

11. The inductor according to claim 1, wherein a deviation between a third total length of the first upper conductive pattern and the first lower conductive pattern in the first pattern lead-out portion and a fourth total length of the second upper conductive pattern and the second lower conductive pattern in the second pattern lead-out portion is 5% or less.

12. The inductor according to claim 1, wherein a first total length of the first upper conductive pattern and the first lower conductive pattern and a second total length of the second upper conductive pattern and the second lower conductive pattern are equal to each other.

13. The inductor according to claim 1, wherein, in the center portion, the first upper conductive pattern, the first lower conductive pattern, the second upper conductive pattern, and the second lower conductive pattern have a same length.

14. The inductor according to claim 1, wherein a sum of a length of the first upper conductive pattern and a length of the first lower conductive pattern in the first pattern lead-out portion is equal to a sum of a length of the second upper conductive pattern and a length of the second lower conductive pattern in the second pattern lead-out portion.

15. The inductor according to claim 1, wherein one end of the first lower conductive pattern is a first input terminal, one end of the first upper conductive pattern is a first output terminal, one end of the second lower conductive pattern is a second input terminal, and one end of the second upper conductive pattern is a second output terminal.

16. The inductor according to claim 15, wherein a direction in which a first current flows from the first input terminal to the first output terminal is equal to a direction in which a second current flows from the second input terminal to the second output terminal.

17. A circuit board, comprising:

a board;

a circuit unit disposed on the board; and an EMI filter configured to be electrically connected to the circuit unit, wherein the EMI filter includes an inductor and a capacitor, wherein the inductor includes:

a core unit including an upper core and a lower core; and a coil unit partially disposed inside the core unit, the coil unit including a first coil unit and a second coil unit, wherein the first coil unit includes:

a first substrate;

a first upper conductive pattern disposed on an upper surface of the first substrate; and a first lower conductive pattern disposed on a lower surface of the first substrate, wherein the second coil unit includes:

a second substrate;

a second upper conductive pattern disposed on an upper surface of the second substrate; and a second lower conductive pattern disposed on a lower surface of the second substrate, wherein the coil unit includes:

a center portion including a plurality of turns of each of the first upper conductive pattern, the first lower conductive pattern, the second upper conductive pattern, and the second lower conductive pattern;

a first pattern lead-out portion disposed on one side of the center portion, the first pattern lead-out portion including one end of each of the first upper conductive pattern and the first lower conductive pattern led out from the center portion; and a second pattern lead-out portion disposed on an opposite side of the center portion, the second pattern lead-out portion including one end of each of the second upper conductive pattern and the second lower conductive pattern led out from the center portion, and wherein, in the second pattern lead-out portion, the second upper conductive pattern and the second lower conductive pattern overlap each other in a vertical direction such that at least a portion of the second upper conductive pattern and at least a portion of the second lower conductive pattern intersect each other when viewed in a plan view.

18. The circuit board according to claim 17, wherein, in the first pattern lead-out portion, the first upper conductive pattern and the first lower conductive pattern is spaced apart from each other when viewed in the plan view.

19. The circuit board according to claim 17, wherein a deviation between a first total length of the first upper conductive pattern and the first lower conductive pattern and a second total length of the second upper conductive pattern and the second lower conductive pattern is 5% or less.

20. The circuit board according to claim 17, wherein a deviation between a third total length of the first upper conductive pattern and the first lower conductive pattern in the first pattern lead-out portion and a fourth total length of the second upper conductive pattern and the second lower conductive pattern in the second pattern lead-out portion is 5% or less.

* * * * *